US008527118B2

(12) United States Patent
Jones et al.

(10) Patent No.: US 8,527,118 B2
(45) Date of Patent: Sep. 3, 2013

(54) AUTOMATED SAFE FLIGHT VEHICLE

(75) Inventors: Richard D Jones, Issaquah, WA (US); David A. Whelan, New Port Coast, CA (US); Lynne L. Wenberg, Seattle, WA (US)

(73) Assignee: The Boeing Company, Chicago, IL (US)

( * ) Notice: Subject to any disclaimer, the term of this patent is extended or adjusted under 35 U.S.C. 154(b) by 557 days.

(21) Appl. No.: 11/874,037

(22) Filed: Oct. 17, 2007

(65) Prior Publication Data

US 2009/0105890 A1 Apr. 23, 2009

(51) Int. Cl.
- *G05D 1/00* (2006.01)
- *G01C 23/00* (2006.01)
- *B64C 13/16* (2006.01)
- *G08B 21/00* (2006.01)

(52) U.S. Cl.
USPC ............... 701/11; 701/3; 244/76 R; 340/945

(58) Field of Classification Search
USPC ....... 701/1–18; 340/945–983; 244/3.1–3.21, 244/17.13, 17.17, 17.19, 34 R–35 R, 36–39, 244/198–219, 53 R, 54–74, 73 B, 73 C, 73 R, 244/76 R, 75.1, 174–197, 78.1–78.2, 79–82, 244/76 A, 76 B, 76 C, 76 J, 20–237, 90 A, 244/90 B, 90 R, 91–99.9, 75 R, 75 A, 78, 244/123, 78.1–78.2; 342/29, 33, 30, 34, 342/35–51, 63, 92, 95, 97, 104–164, 357.2, 342/357.21, 357.22, 357.23–357.25, 357.34–357.36, 342/357.53, 357.61, 357.71, 458, 461, 462
See application file for complete search history.

(56) References Cited

U.S. PATENT DOCUMENTS

| | | | |
|---|---|---|---|
| 2,322,225 A | 6/1943 | Crane et al. | |
| 2,612,331 A | 9/1952 | Frazier | |
| 3,094,299 A | 6/1963 | Bond | |
| 3,806,934 A * | 4/1974 | Hays, Jr. | 342/411 |
| 4,642,774 A * | 2/1987 | Centala et al. | 701/8 |
| 5,631,640 A | 5/1997 | Deis et al. | |
| 5,798,695 A | 8/1998 | Metalis et al. | |
| 6,112,141 A * | 8/2000 | Briffe et al. | 701/14 |

(Continued)

FOREIGN PATENT DOCUMENTS

| | | | |
|---|---|---|---|
| EP | 1422680 | | 5/2004 |
| EP | 1586969 | | 10/2005 |
| JP | 2001266297 A | * | 9/2001 |
| WO | WO2006/042191 | * | 4/2006 |

OTHER PUBLICATIONS

UK Combined Search and Examination Report for Application No. GB0818910.2, dated Feb. 16, 2009, 7 pgs.

*Primary Examiner* — Muhammad Shafi
(74) *Attorney, Agent, or Firm* — Caven & Aghevli LLC (57) ABSTRACT

Control systems and methods of use provide for fully automated phases of flight of an aircraft. Such fully automated phases include takeoff, cruising flight, and landing without the need for operator input or other operator intervention. Control systems and methods also provide for self-limited compliance with an operators desired deviation from a predetermined flight path, as well as automatic contingency response to non-normal conditions. Onboard and/or ground-based operators may cooperate with the control system in order to control the associated aircraft. Furthermore, an operator need not have any flight skill in order to affect changes in the flight path or other aspects of flight control.

8 Claims, 5 Drawing Sheets

(56) References Cited

U.S. PATENT DOCUMENTS

| | | |
|---|---|---|
| 6,424,889 B1 | 7/2002 | Bonhoure et al. |
| 6,571,155 B2 * | 5/2003 | Carriker et al. ............... 701/3 |
| 6,739,556 B1 | 5/2004 | Langston |
| 6,845,302 B2 | 1/2005 | Moretto |
| 2003/0071743 A1 * | 4/2003 | Seah et al. ............... 340/945 |
| 2003/0191561 A1 * | 10/2003 | Vos ............... 701/3 |
| 2004/0021581 A1 * | 2/2004 | Weigl ............... 340/945 |
| 2004/0239529 A1 * | 12/2004 | Tran ............... 340/961 |
| 2005/0004723 A1 * | 1/2005 | Duggan et al. ............... 701/24 |
| 2006/0025899 A1 | 2/2006 | Peckham et al. |
| 2006/0041345 A1 * | 2/2006 | Metcalf ............... 701/33 |
| 2007/0221782 A1 | 9/2007 | Cerchie et al. |
| 2007/0235594 A1 * | 10/2007 | Wingett et al. ............... 244/223 |
| 2008/0142642 A1 * | 6/2008 | Marino et al. ............... 244/223 |

* cited by examiner

AUTOMATED SAFE FLIGHT VEHICLE

FIELD OF THE INVENTION

The field of the present disclosure relates to aircraft control systems, and more specifically, systems that fully automate aircraft travel such that dependence upon trained pilot skill is unnecessary.

BACKGROUND OF THE INVENTION

Aircraft vehicles that carry passengers and/or appreciable amounts of cargo are presently operated by an onboard human flight crew. In fact, most flight situations involve at least a pilot and co-pilot onboard the aircraft operating from the cockpit area. Such manned flight is still subject to human error despite the high levels of costly training and skill that these flight control personnel typically possess.

A number of present automation systems exist to provide advisory information, automate certain tasks, and generally relieve the flight crew of some burdens. Examples of such systems include ground collision warning systems, stall warning systems, air traffic advisory and avoidance systems, and automated flight management and instrument landing systems. Additionally, other automated systems have been developed and demonstrated that go beyond simple pilot advisement. These include autopilot and auto-throttle systems, including area navigation and vertical navigation capabilities). Enhanced stall protection, auto-land and auto-braking are other examples. Still another example is an experimental ground collision avoidance system developed under a NASA research and development contract, wherein control of an aircraft is taken over to avoid controlled flight into terrain.

Automated systems such as those exemplified above, as well as other complexities of modern aircraft, compound the ongoing training requirements of flight crew personnel. The foregoing exemplary systems are directed to workload reduction only, so flight crew personnel must be trained in the operation of such aircraft with the automated systems turned off. Additionally, medical qualifications, age, and/or other concerns contribute to the cost of maintaining an adequate pool of qualified flight operations talent. Known flight crew advisement and control systems are insufficient in view of desired levels of flight safety and automation. Therefore, novel systems and methods that resolve the foregoing problems and concerns would have great utility.

SUMMARY

Flight control systems and methods in accordance with the teachings of the present disclosure can be used to fully automate one, several, or all phases of flight of a suitably equipped aircraft. Such automation requires no operator intervention in order to handle all flight control needs. Also, such systems are always operational and primarily responsible for safe aircraft operation. In this way, fully automated passenger and/or cargo flights can be performed, including takeoff, cruising flight and landing, without the need for any skilled personnel (pilot or copilot) onboard the aircraft. Reduced cost of operation is realized and flight safety is enhanced under the present disclosure. Other advantages include the virtual elimination of flight accidents due to pilot error and the reduction of flight crew training requirements. In a context of military operations, aircraft can be routinely operated by non-pilots, and free onboard personnel to concentrate on mission requirements such as weapons deployment, intelligence gathering, etc.

In one embodiment, a system includes a plurality of subsystems that are cooperatively configured so as to automatically control an aircraft during one or more phases of travel. Such automatic control does not require operator input to the system. The aircraft is configured to transport passengers and/or non-flight-related cargo. The system is configured to perform automated takeoff, automated cruising flight toward a predetermined destination, and automated landing of the aircraft.

In another embodiment, a method includes automatically controlling an aircraft without requiring an operator intervention. The aircraft is configured to carry passengers or non-flight-related cargo. The method includes performing at least one of automated takeoff, and automated landing.

In yet another embodiment, a computer-readable storage media includes a computer-readable code. The computer-readable code is configured to cause one or more processors to automatically control an aircraft without operator intervention. The computer-readable code is further configured to cause one or more processors to perform automated takeoff, automated cruising flight toward a predetermined destination, and automated landing of the aircraft.

The features, functions, and advantages that are discussed herein can be achieved independently in various embodiments of the present disclosure or may be combined various other embodiments, the further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

The present disclosure introduces highly-integrated and autonomous flight control systems and operational methods using such control systems. Many specific details of certain embodiments of the disclosure are set forth in the following description and in FIGS. 1-5 to provide a thorough understanding of such embodiments. One skilled in the art, however, will understand that the disclosure may have additional embodiments, or that the disclosure may be practiced without several of the details described in the following description.

Figure 1:
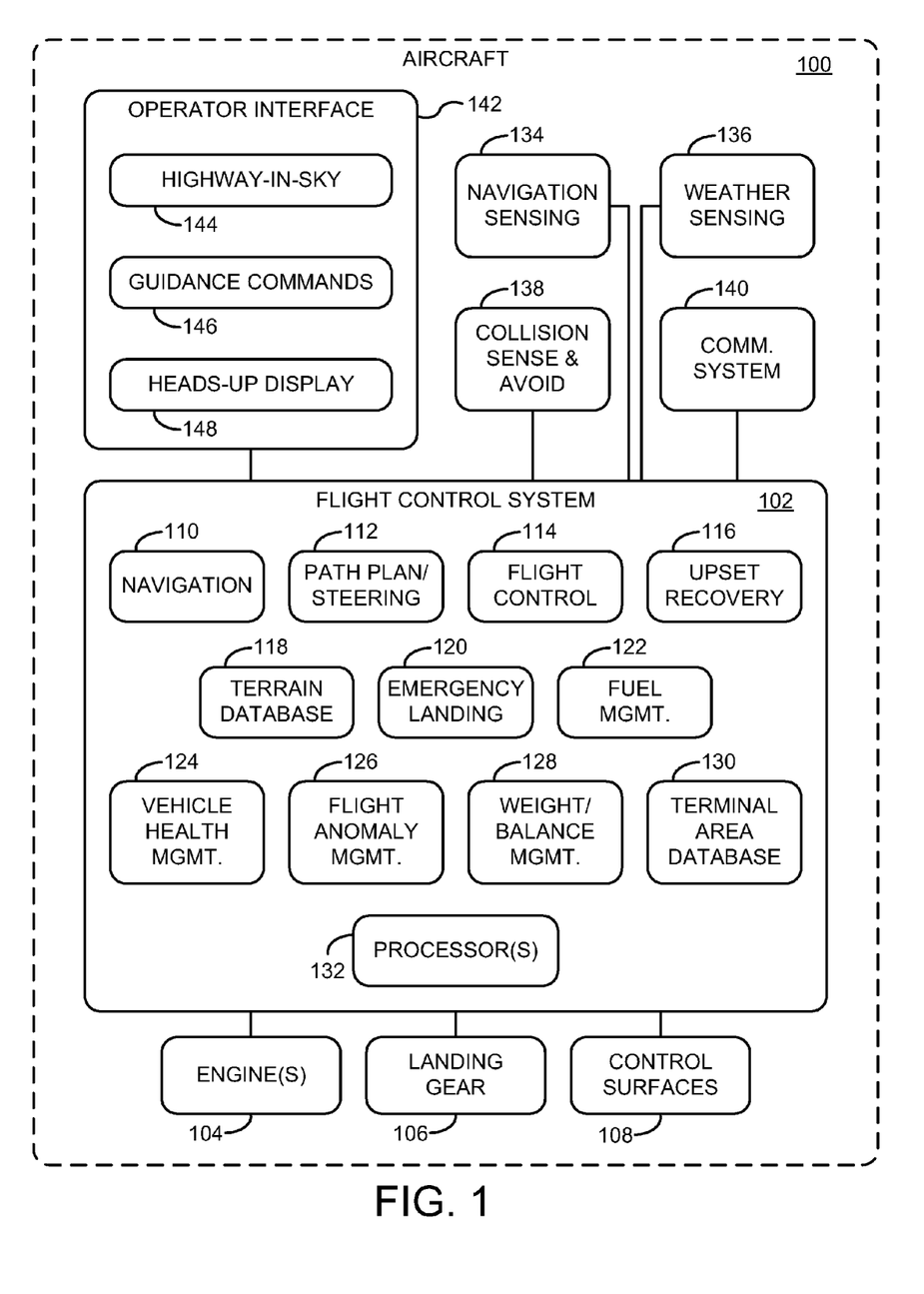
FIG. 1 is a block diagrammatic view depicting an aircraft having a control system according to an embodiment of the disclosure.

Exemplary Systems:

FIG. 1 is a block diagrammatic view of an aircraft 100 having a flight control system (control system) 102 in accordance with an embodiment of the disclosure. The aircraft includes one or more engines 104, landing gear 106, and control surfaces 108. One of ordinary skill in the aeronautical engineering arts is familiar with various embodiment of the respective elements 104-108, and further elaboration is not required for purposes herein. The control system 102 includes a plurality of subsystems and resources that are cooperatively configured to automatically control essentially all operational aspects of the aircraft 100. That is, the control system 102 is configured to fully automate various phases of travel of the aircraft 100 such that little or no operator input (i.e., intervention) is required.

The control system 102 includes a navigation subsystem 110. The navigation subsystem 110 is configured perform all normal aspects of aircraft navigation, including the use of global positioning signals, radio navigation beacons, celestial sensing, and/or other means for determining instantaneous location, and distance and direction to a multitude of known points. In this way, the navigation subsystem 110 is considered redundant. The control system 102 includes a path planning and steering subsystem 112. The path planning and steering subsystems 112 works in cooperation with the navigation subsystem 110 to calculate and plot a flight path for the aircraft to a predetermined (operator and/or automatically selected) location. The path planning and steering subsystems 112 also works in cooperation with other subsystems of the flight control system 102 as explained in further detail hereinafter.

The control system 102 of FIG. 1 also includes a flight control subsystem 114. The flight control subsystem 114 is configured to function in a ready, autonomous manner keeping track of numerous aspects of aircraft 100 operation. The flight control subsystem 114 is further configured to implement fully automated control of the aircraft 100 (or select subsystems thereof) in the event that such high-level automation is requested by an operator or becomes necessary in an emergency response situation. In this way, the flight control subsystem 114 ties together several of the control subsystems and their respective functions such that the control system 102 exhibits a continuous "awareness" of aircraft 100 operations.

The control system 102 of also includes an upset recovery subsystem 116 configured to provide fast, automatic response and correction of abnormal or unanticipated conditions during travel of the aircraft 100. Non-limiting examples of such abnormal or unanticipated conditions include wind-shear, lightning strike, loss of stable flight attitude, loss of function and/or communication with one or more subsystems, drop in control hydraulic pressure, etc. The upset recovery subsystem 116 cooperates with other subsystems such that appropriate correctional control of the engine(s) 104, landing gear 106 and/or control surfaces 108 is performed. The control system 102 further includes a terrain database 118. The terrain database 118 includes detailed data regarding land surface features (e.g. mountains, tall building structures, lakes and seas, etc.) such that crash avoidance is automatically provided by way of cooperation with the navigation subsystem 110 and other subsystems of the control system 102. The terrain database can also include data regarding restricted airspaces (i.e., no-fly zones) and other areas to be avoided.

The flight control system 102 also includes an emergency landing subsystem 120, which is configured to perform full automated landing of the aircraft 100 by way of cooperation with other subsystems and aspects of the control system 102. Thus, the emergency landing subsystem 120 cooperates with and/or controls other subsystems and the engines 104, landing gear 106 (including braking) and control surfaces 108 as needed. The flight control system 102 includes a fuel management subsystem 122. The fuel management subsystem 122 is configured to monitor fuel consumption during travel, and balance of fuel-related weight within the aircraft 100. The fuel management subsystem 122 is further configured to cooperate with other subsystems of the control system 102 in the event that aircraft 100 must be rerouted to a new destination in response to an unexpected loss of fuel.

The flight control system 102 of FIG. 1 also includes a vehicle health management (health) subsystem 124. The health subsystem 124 is configured to monitor numerous conditions about the aircraft 100 including, but not limited to: electrical power generation, battery storage voltages, hydraulic control pressures, passenger cabin oxygen and/or atmospheric pressure levels, fire and/or smoke detection, vibration sensing, etc. The health subsystem functions to provide status information and alerts to other subsystems of the control system 102 as needed and in accordance with predetermined criteria. The flight control system 102 includes a flight anomaly management (anomaly) subsystem 126. The anomaly subsystem 126 is configured to monitor numerous operational aspects of the aircraft 100, and to calculate a contingency response in the event that an anomalous condition is detected. Non-limiting examples of such anomalous conditions include loss (drop) in hydraulic pressure, detection of other air vehicles in near proximity to the aircraft 100, sudden loss of electrical generation, loss of control of a wing control surface, etc. The anomaly subsystem 126 further cooperates with other subsystem of the control system 102 in order to automatically implement the calculated contingency response, with or without operator intervention.

The flight control system 102 further includes a weight and balance management (weight/balance) subsystem 128. The weight/balance subsystem 128 is configured to detect and analyze the overall weight of the aircraft 100, and the distribution of that weight, prior to takeoff and during flight and landing phases of travel. The weight/balance subsystem 128 is capable of providing information to an onboard and/or remote operator entity in the event that corrected measures (i.e., load redistribution and/or reduction) are needed. The weight/balance subsystem 128 is further capable of automatically preventing aircraft takeoff in the event that total load or distribution thereof exceeds pre-established limits. The flight control system 102 of FIG. 1 includes a terminal area database 130. The terminal area database 130 includes detailed data including, for example, respective airport terminal locations, aircraft number and size handling capacities, emergency response capabilities, surrounding area information, etc. The terminal area database 130 is configured to be accessed during normal automated flight and during contingency response maneuvers, such as calculating a closest emergency landing site (e.g., as implemented by way the anomaly subsystem 126 discussed above.

The flight control system 102 further includes one or more processors 132. The one or more processors 132 are configured to function in accordance with a computer-readable code provided to the flight control system 102 by way of computer-readable storage media. While not depicted in FIG. 1, one of skill in the computing and control arts can appreciate that such computer-readable storage media includes, but is not limited to, solid state memory, optical storage media, magnetic storage media, etc. Other suitable forms of computer-readable storage media can also be used in accordance with the particular embodiment of control system 102. In any case, the one or more of the subsystems 110-130 can be implemented, at least in part, by executable program code provided to the one or more processors 132 by way of suitable computer-readable storage media.

The aircraft 100 of FIG. 1 also includes navigation sensing resources 134. The navigation sensing resources 134 are configured to detect, as non-limiting examples, global positioning signals, radio navigation signals, celestial objects, etc., and to communicate that sensed information to the navigation subsystem 110. The aircraft 100 includes weather sensing resources 136 configured to detect weather information by way of, for example, barometric pressure sensing, temperature sensing, Doppler radar, etc., and communicate that sensed information to the navigation subsystem 110 and/or other subsystems of the control system 102.

The aircraft 100 further includes a collision sensing and avoidance resources 138 configured to detect near-proximity aircraft, topographical features, and other collision hazards. The collision sensing and avoidance resources 138 are further configured to communicate that information to the flight anomaly management subsystem 126 and/or other subsystems of the control system 102 so that appropriate collision or crash avoidance measures can be automatically implemented. Pertinent information can be communicated to or exchanged with near-proximity air vehicles as a part of an overall and/or situation-specific collision avoidance scheme. The aircraft 100 also includes communication system 140 that is in communication with, and at least partially controlled by, the control system 102. The communication system 140 is configured to perform bidirectional wireless communication between the aircraft 100 and external entities. Such wireless signals can include, for example, satellite signals, shortwave radio signals, etc. The communication system 140 is considered in the aggregate and includes both digital data and voice communications modes.

The resources 134-140, inclusive, are depicted in FIG. 1 as external to the flight control system 102 in the interest of conceptual clarity. However, any one or more of the respective resources 134-140 can be considered a portion or extension of the flight control system 102.

The aircraft 100 of FIG. 1 includes an operator interface 142 in communication with the flight control system 102. The operator interface 142 includes a visual highway-in-the-sky representation (representation) 144 of a predetermined flight path as presently being traversed by the aircraft 100. The representation 144 provides an operator with an animated, seemingly three-dimensional road-like depiction superimposed (i.e., projected) over the normal, forward-looking cockpit view from the aircraft 100. In this way, those who are unskilled in aircraft operation are provided with a familiar visual frame of reference in order to interpret the present, fully automated flight of the aircraft 100. Also, other information such as keep-out zones, dangerous terrain, and other features can be visually depicted within the highway-in-the-sky representation 144.

The operator interface 142 also includes guidance commands 146. The guidance commands 146 include both visual and force feedback to a human operator seeking to deviate from a predetermined flight path of the aircraft 100. For example, an onboard operator can input a desire to deviate away from the predetermined flight path by way of input through a logical control inceptor, or human guidance input device. Such a device can be in the form of a traditional wheel or "stick", or some other suitable form. This information is communicated to the control system 102. In response, the control system 102 complies with the operator input and automatically controls aircraft travel away from the predetermined flight path. Automatically imposed compliance limitations (explained in greater detail hereinafter) are communicated by way of force feedback against the operator. In this way, the (typically) unskilled operator is provided with intuitive information regarding the limited nature of automatic control compliance: "the aircraft cannot be permitted to travel any further off the predetermined course".

The operator interface 142 further includes a heads-up display 148. The heads-up display 148 provides flight information electronically projected over the forward-looking cockpit view from the aircraft 100. Such information can include, for example, airspeed, groundspeed, fuel level, compass heading, range-to-destination, present location (i.e., coordinates), etc. Other information can also be provided by way of the heads-up display 148. One of skill in the aviation arts is familiar with heads-up display technology and is aware of standard symbology incorporated therein. The operator interface 142 can further include other mechanisms and resources as needed to provide for safe and efficient bidirectional (input and output) operator access of the flight control system 102.

The aircraft 100 can includes other features as needed to enable passenger and/or cargo transport. As used herein, such cargo is considered non-flight-related cargo having nothing to do with the operation of the aircraft 100. In one or more embodiments, the aircraft 100 is a 700-series commercial airliner available from Boeing Company, Chicago, Ill., suitably equipped with the flight control system 102 of FIG. 1 or another control system embodiment consistent with the present disclosure. Thus, the automatic control teachings presented herein are envisioned to be embodied, for example, within various forms of commercial passenger airliner and cargo-carrying aircraft. The aircraft 100 of FIG. 1 and control system 102 thereof are non-limiting exemplary embodiments of the present disclosure. Other embodiments of flight control system and correspondingly equipped aircraft are envisioned having corresponding variations on the teachings presented above. However, fully automated control of one or more phases of aircraft operation (e.g., takeoff, landing, cruising flight, collision avoidance, etc.) are within the scope of all such embodiments of the present disclosure.

Exemplary Operations:

The aircraft 100 of FIG. 1 is capable of numerous modes of operation and automated travel scenarios by virtue of the flight control system 102 and its respective subsystems and resources. Hereinafter, just a few exemplary usage operations are presented so that the scope of the present disclosure is more fully appreciated.

Figure 2:
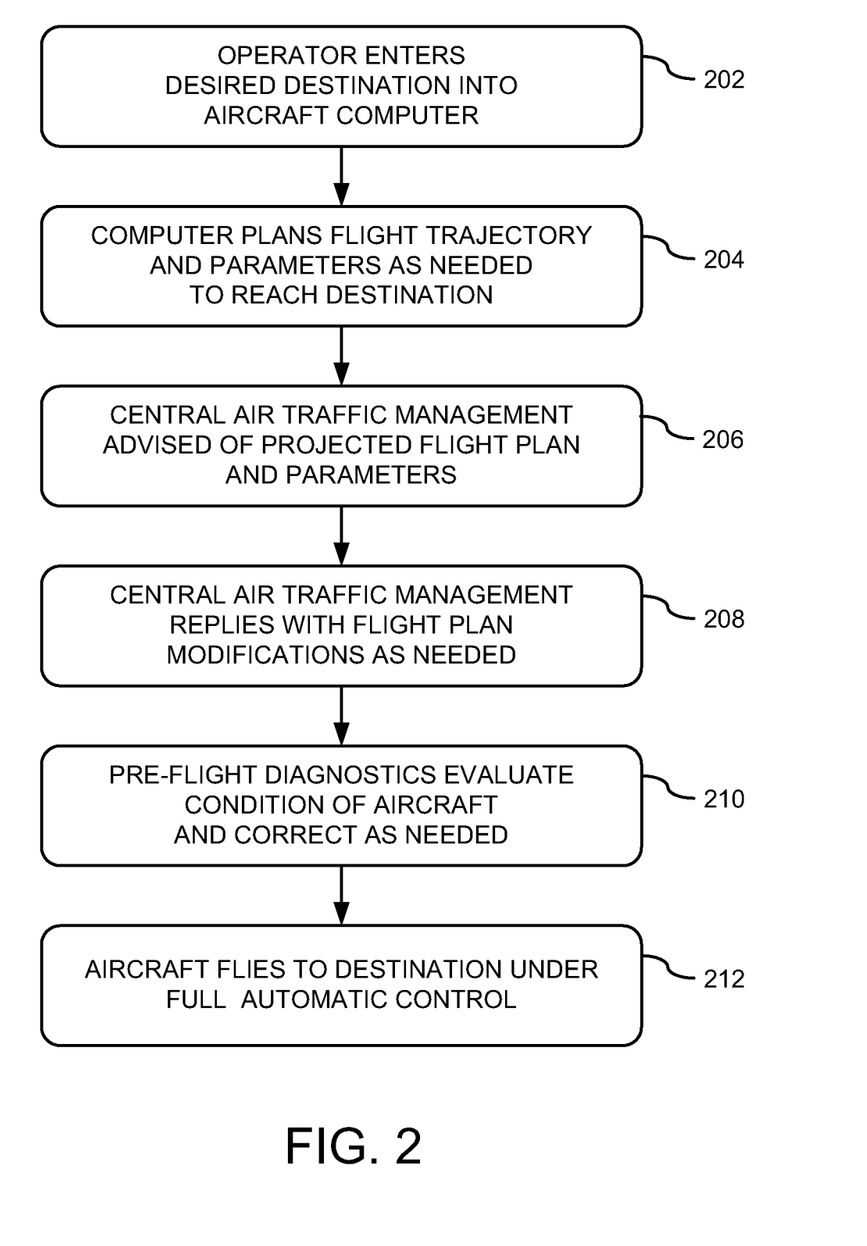
FIG. 2 is a flowchart depicting a method of automated flight operations in accordance with one embodiment.

FIG. 2 is flowchart depicting an exemplary method of operation in accordance with the present disclosure. While the method of FIG. 2 depicts particular steps and order of execution, other embodiments can be defined and used that are suitably varied from that depicted in FIG. 2. The method of FIG. 2 will be explained below with reference to the elements of FIG. 1 for purposes of understanding.

At 202, an operator inputs a desired destination into the flight control system 102 of the aircraft 100. Such entry is accomplished by way of the operator interface 142. Selection of the destination can be made, for example, from a displayed list and/or map of available destinations within the flight range or authorization of the aircraft 100.

At 204, the flight control system 102 automatically calculates (determines) a flight path (trajectory) and flight parameters (e.g., cruising altitude, noise-abatement takeoff restrictions, cruising speed, departure time, etc.) toward the desired destination. The automatically flight path and related parameters collectively define a flight plan. Various subsystems such as, for example, the path planning and steering subsystem 112, the terminal area database 130, the terrain database, etc., are utilized in determining the flight plan.

At 206, the automatically determined flight plan is communicated by way of the communication system 140 to a central air traffic management center (center). The center reviews the flight plan—either manually, automatically, or by a combination of manual and automatic means—in accordance with present protocols, other flights leaving the point of origin, air traffic density into the desired destination, etc.

At 208, the center provides a reply to the aircraft 100 with any needed flight plan modifications, as well as authorization to embark on the flight in accordance with the modified flight plan. Such modifications can include, for example, an altered cruising altitude, a slightly delayed or advanced departure time, runway selection, etc.

At 210, the flight control system 102 performs a diagnostic evaluation of the aircraft 100 including, for example, weight and balance analysis, engine performance evaluations, vibration measurements, fuel load determination, electrical system performance, communications and navigational sensing checks, hydraulic pressure sensing, control surface testing and range-of-motion verification, etc. Any corrective measures are automatically determined and implemented, including those that require human intervention (i.e., ground and/or flight crew). Departure of the aircraft 100 is contingent upon a complete and satisfactory diagnostic testing procedure.

At 212, the control system 102 controls the aircraft 100 so as to perform fully automated takeoff, cruising flight and landing at the desired destination in accordance with the flight plan as approved by central air traffic management. As such, any passengers and/or cargo aboard the aircraft 100 are transported to the desired destination completely without the need for any onboard flight control operator(s) (i.e., pilot and copilot).

The method of FIG. 2 outlines one exemplary operation according to the present disclosure. Therein, fully automated flight (takeoff, cruising, and landing) are performed under control system 102 control wherein no pilot and/or copilot need accompany the aircraft 100 once travel is underway. Other methods according to the present disclosure anticipate some degree of operator (i.e., user) input (intervention) with the control system 102 or another embodiment according to the present teachings. One exemplary such method is depicted in FIG. 3, and illustrated by FIG. 4.

Figure 3:
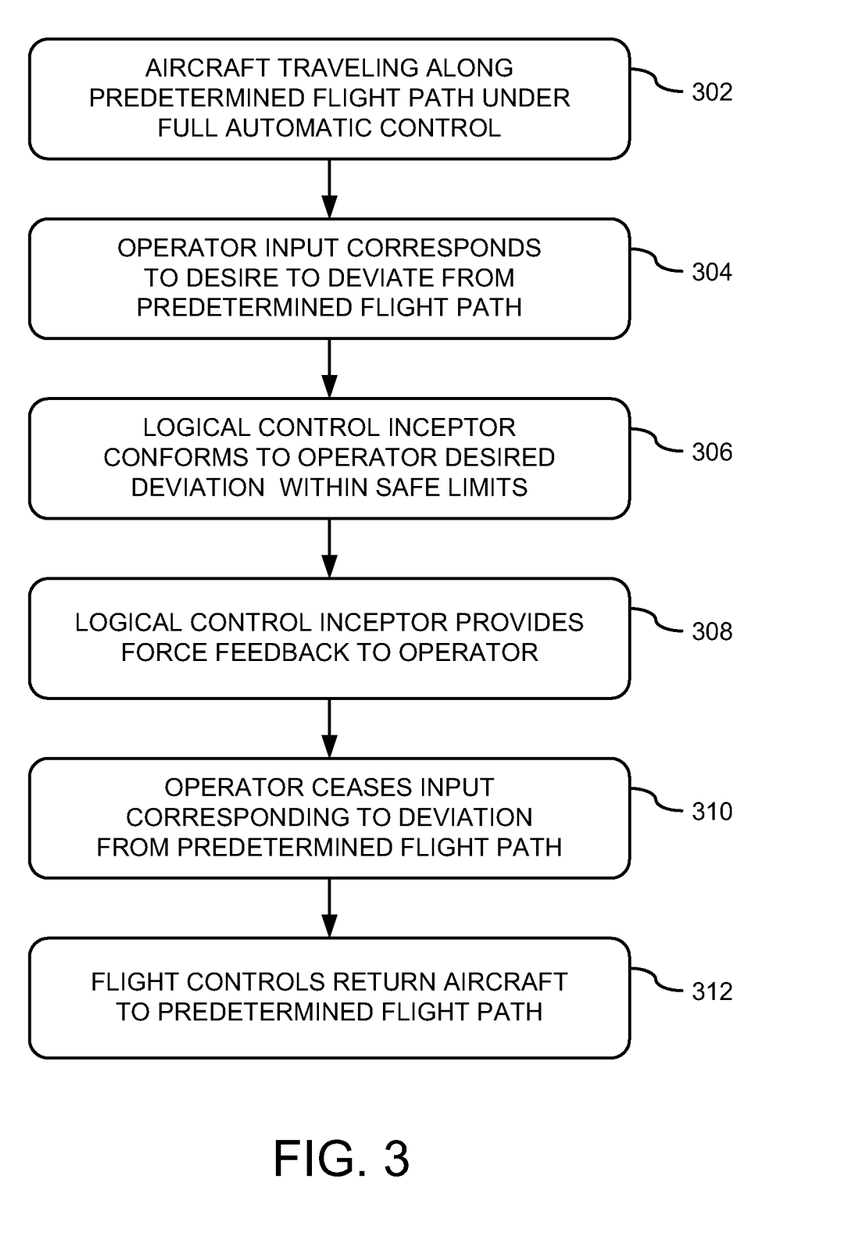
FIG. 3 is a flowchart depicting a method of automated flight operations in accordance with another embodiment.

FIG. 3 is flowchart depicting another exemplary method of operation in accordance with the present disclosure. While the method of FIG. 3 depicts particular steps and order of execution, other embodiments can be defined and used that are suitably varied from that depicted in FIG. 3. The method of FIG. 3 will be explained below with reference to the flight path 400 of FIG. 4 for purposes of understanding.

Figure 4:
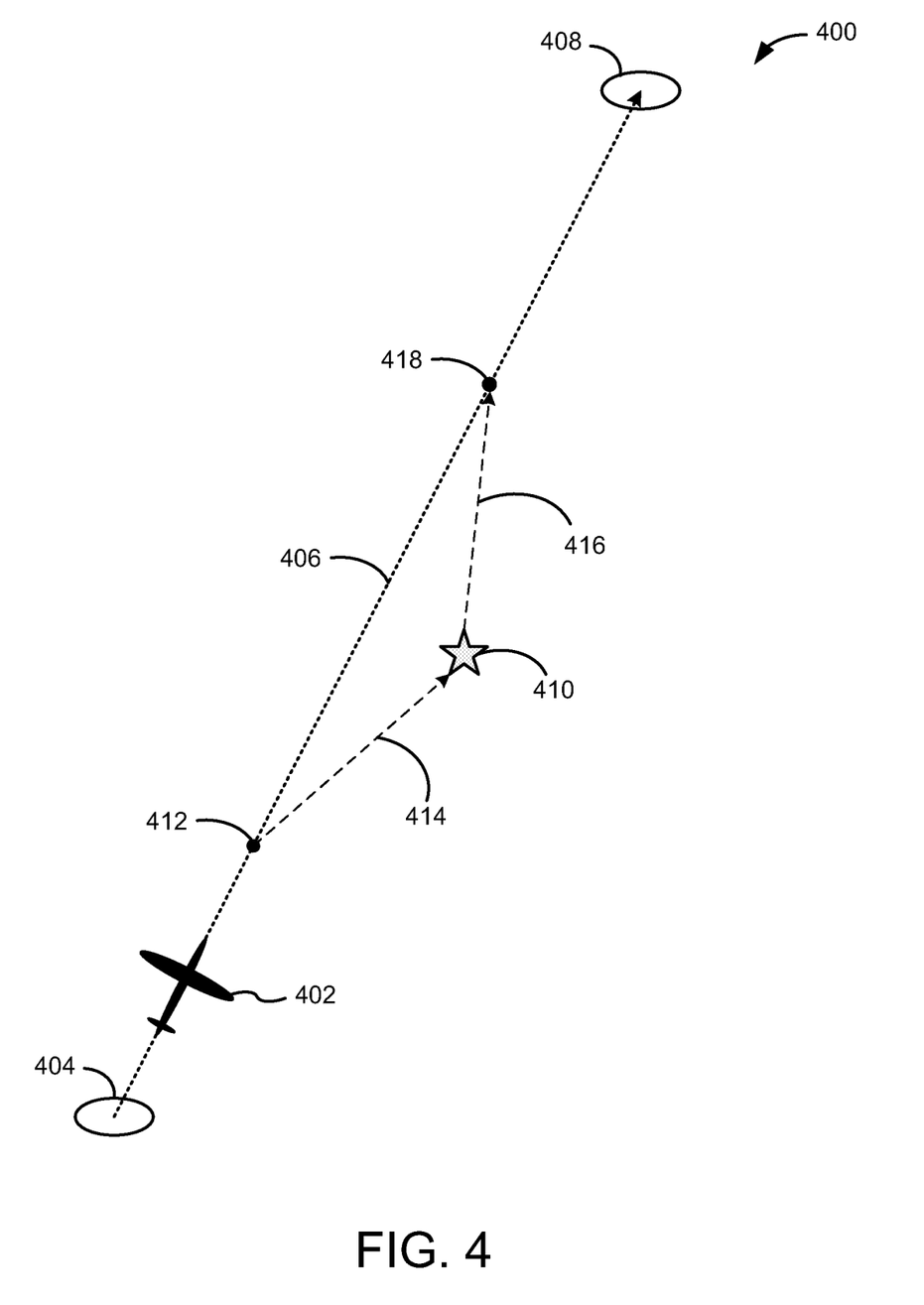
FIG. 4 is a schematic plan view depicting exemplary operations in accordance with the method of FIG. 3.

At 302, an aircraft 402 departs from an origin 404 along a predetermined flight path 406 toward a destination 408. The aircraft 402 includes an automated control system such as, for example, the control system 102 of FIG. 1 or another suitable embodiment according to the present disclosure. Beginning with takeoff, the aircraft 402 is presumed to be under fully automated flight (generally as described above in regard to FIG. 2).

At 304, an onboard operator who is typically, but not necessarily, unskilled in aircraft control provides input to the control system of aircraft 402 indicating a desire to deviate away from the predetermined flight path 406 toward a point of interest 410. Such a point of interest 410 can be, for example, a mount peak, a lake, a canyon area, etc., of scenic or other attraction. The input to the control system can be performed by way of a suitable operator interface such as, for example, a steering wheel, "stick", joystick, or another suitable embodiment according to the present disclosure.

At 306, the logical control inceptor (operator input device) and balance of the flight control system conform to the operator's desired deviation by causing the aircraft 402 to depart from predetermined flight path 406 at the point 412. The aircraft 402 then proceeds along flight path segment 414 toward the point of interest 410 under automated control but in compliance with the operators ongoing input. It is noted that the compliance with the operators desired deviation is limited by the flight control system of the aircraft 402 in accordance with predetermined and/or real time criteria (no-fly zone, dangerous ground terrain, present weather conditions, etc.). In any case, the aircraft 402 is presumed to fly near and/or over the point of interest 410 in accordance with the operator's wishes.

At 308, the control system of the aircraft 402 provides force feedback by way of the operator interface (e.g., stick, wheel, etc.) indicating to the operator that further deviation from the predetermined flight path 406 is not permitted under present parameters. Such force is proportional, typically, to the proximity of the aircraft 402 with a permissible boundary or absolute limitation to the permitted deviation. In short, the closer the aircraft is to the limit, the greater the opposing feedback force exerted on the user by way of the operator interface. In any case, flight beyond the permitted zone of deviation or into a no-fly-area, for example, would be automatically precluded.

At 310, the operator ceases input to the flight control system of the aircraft 402. Such end of operator input is presumed to be prompted by the force feedback upon the operator by way of the operator interface. In any case, the flight control system detects that further deviation is not desired by the operator.

At 312, the flight control system automatically controls the aircraft 402 to fly back toward the predetermined flight path 406 along flight path segment 416. The aircraft 402 returns to the predetermined flight path 406 at point 418 and continues fully automated flight to, and landing at, the destination 408.

In the method of FIG. 3, the operator inputs a desire to deviate away from a predetermined flight path by way of simple steering-like manipulate of a wheel, "stick" (i.e., joystick), or other input device to the flight control system of the aircraft. In turn, force feedback is provided to the operator by way of the same input device in order to indicate automated limitation of compliance with the desired deviation. Thereafter, the aircraft is automatically returned to a predetermined flight path and continues travel to the predetermined destination. In this way, a non-pilot (i.e., unskilled person) can assume some automatically limited and executed control of an aircraft under the present disclosure in a straightforward and intuitive manner. The sophisticated operator interface (e.g., 142 of FIG. 1) enables such unskilled user intervention under the present disclosure by way of the highway-in-the-sky representation, heads-up display, and/or other mechanisms.

Under the method of FIG. 3, an operators input to the control system of aircraft 402 is essentially "high-level" in nature, consisting generally of flight path angle and/or inertial heading rate. The flight control system of the aircraft 402 then converts and/or determines other control parameters including, for example, angle of attack, bank angle, roll rate, pitch rate, yaw rate, etc., to achieve desired guidance. Additionally, an operator can input desired speed control parameters such as "best cruise performance", "fastest", or "slowest" speed settings. The flight control system would automatically comply as closely as possible with the operator's desire within safe operating specifications (i.e., envelope) for the particular aircraft.

In another method embodiment similar to that of FIG. 3, there is no onboard operator present. Any passengers on the aircraft are not considered operators in this exemplary context. Under such a scenario, a ground-based operator (e.g., at a regional flight center, etc.) provides input directed to causing the aircraft 402 to deviate from the flight path 406 toward the point of interest 410. Such operator input is communicated to, and force feedback information is received from, the aircraft 402 by way of wireless signals. The ground-based operator may, for example, note that the flight is passing near a surface feature of interest (e.g., the Grand Canyon, Mt. Rainier, etc.) and wishes to give flight passengers an opportunity to better view the feature from the air. In any case, the balance of the operations of the method of FIG. 3 are executed substantially as described above, but without any onboard human intervention. The present example is one of any number wherein a ground-based (or otherwise remote) operator exercises at least some degree of control over the aircraft 402 by way of input to the flight control system.

Figure 5:
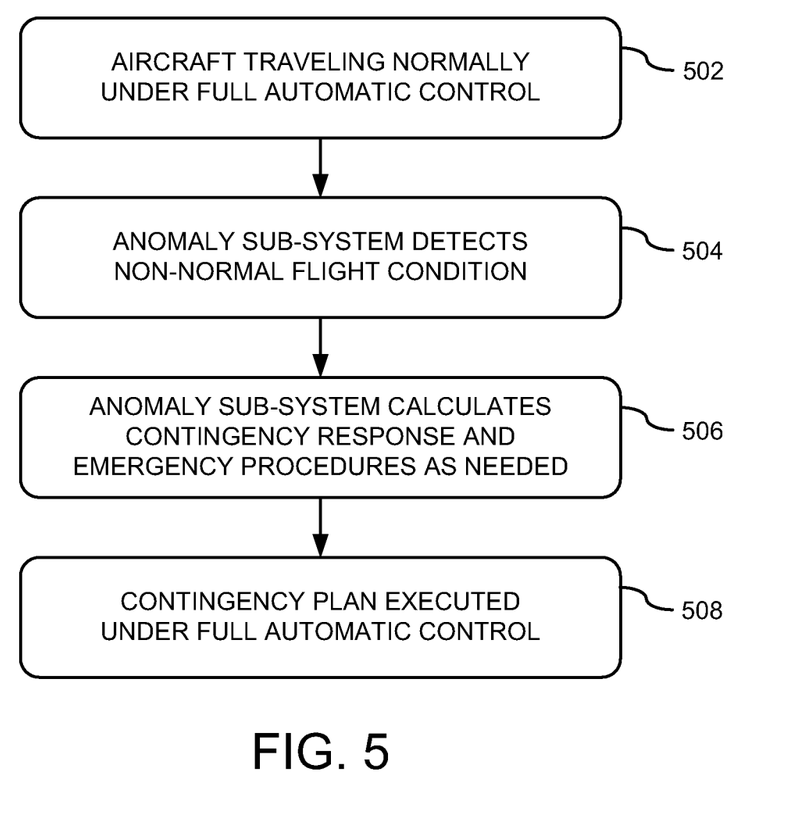
FIG. 5 is a flowchart depicting a method of automated flight operations in accordance with yet another embodiment.

FIG. 5 is flowchart depicting another exemplary method of operation in accordance with the present disclosure. While the method of FIG. 5 depicts particular steps and order of execution, other embodiments can be defined and used that are suitably varied from that depicted in FIG. 5. The method of FIG. 5 will be explained below with reference to the aircraft 100 of FIG. 1 for purposes of understanding.

At 502, an aircraft 100 is traveling under fully automated control toward a predetermined destination. Such control is performed by way of a flight control system 102 or another suitable embodiment according to the present disclosure.

At 504, the anomaly subsystem 126 of the aircraft 100 detects a non-normal flight condition. For purposes of example, it is presumed that the anomaly subsystem is informed by the fuel management system 122 that fuel quantities are decreasing at a rate higher than anticipated by present engine output. Such decreasing quantities are presumed indicative of a leak in the fuel system. In any case, the anomaly subsystem 126 is "aware" of abnormal circumstances and begins to react.

At 506, the anomaly subsystem 126 calculates a contingency response to the detected non-normal condition. In the present example, the anomaly subsystem 126 determines an estimated available flight range of the aircraft from its present position in view of engine loading, rate of fuel loss, and other relevant factors. The anomaly subsystem 126 also determines an emergency landing site (i.e., airport) that is within range and suitable equipped to handle the situation upon landing.

At 508, the flight control system 102 executes the contingency response plan under fully automated control of the aircraft 100. In the ongoing example, the aircraft 100 is rerouted to the emergency airport calculated (determined) at 506 above. Upon arrival, the control system 102 executes a fully automated landing of the aircraft 100. Furthermore, the control system 102 communicates with ground resources such as, for example, a central flight management center (center), to inform them of the situation and the contingency response to be executed. In this way, ground-based emergency response teams are alerted to the impending needs of the aircraft 100 prior to its arrival at the emergency landing site.

The method of FIG. 5 is exemplary of any number of possible detect-and-respond scenarios that can be automatically handled by control system embodiments of the present disclosure. Thus, significant non-normal flight events aboard a suitably controlled aircraft can be handled without onboard operator intervention.

While specific embodiments of the disclosure have been illustrated and described herein, as noted above, many changes can be made without departing from the spirit and scope of the disclosure. Accordingly, the scope of the disclosure should not be limited by the disclosure of the specific embodiments set forth above. Instead, the disclosure should be determined entirely by reference to the claims that follow.

What is claimed is:

1. A computer-based method to automatically manage flight operations of a manned aircraft, comprising:
   receiving, in a computer-based flight control system, a destination for a flight;
   determining, in the computer-based flight control system, a predetermined flight path and one or more flight parameters to the destination;
   navigating an aircraft along the predetermined flight path using autopilot controls;
   receiving, in the computer-based flight control system, operator input from an operator interface to direct the aircraft along a flight path segment which deviates from the predetermined flight path by overriding the autopilot controls;
   generating, in the computer-based flight control system, one or more control signals to direct the aircraft from the predetermined flight path to the flight path segment which deviates from the predetermined flight path;
   generating, in the computer-based flight control system, one or more feedback signals to provide force feedback against control instructions from the operator interface when the control instructions attempt to navigate the aircraft along a flight path segment which deviates from the predetermined flight path, wherein the force feedback indicates that further deviation from the predetermined flight path will not be permitted; and directing the aircraft to resume travel along the predetermined flight path despite the receiving the operator input from the operator interface when a distance of the aircraft from the predetermined flight path exceeds a permitted deviation distance.

2. The method of claim 1, wherein the force feedback is proportional to a distance of the aircraft from the predetermined flight path.

3. The method of claim 2, wherein the force feedback increases as a distance of the aircraft from the predetermined flight path increases.

4. The method of claim 3, wherein the operator interface is located within the aircraft.

5. The method of claim 1 wherein the permitted deviation distance is based on at least one of a no fly zone and a fuel-based limitation.

6. The method of claim 1, wherein the operator interface is a control stick.

7. A computer-based method to automatically manage flight operations of a manned aircraft, comprising:
   receiving, in a computer-based flight control system, a destination for a flight;
   determining, in the computer-based flight control system, a predetermined flight path and one or more flight parameters to the destination;
   navigating an aircraft along the predetermined flight path using autopilot controls;
   receiving, in the computer-based flight control system, a control signal via an operator interface to direct an aircraft along a flight path segment which deviates from the predetermined flight path by overriding the autopilot controls;
   generating, in the computer-based flight control system, one or more control signals to direct the aircraft from the predetermined flight path to the flight path segment which deviates from the predetermined flight path in response to the received pressure;

generating, in the computer-based flight control system, one or more feedback signals to provide force feedback against the operator interface when the aircraft is directed along a flight path segment which deviates from the predetermined flight path, wherein the force feedback indicates that further deviation from the predetermined flight path will not be permitted; and directing the aircraft to resume travel along the predetermined flight path upon a termination of the received control signals; and directing the aircraft to resume travel along the predetermined flight path despite the receiving the operator input from the operator interface when a distance of the aircraft from the predetermined flight path exceeds a permitted deviation distance.

8. The method of claim 7, wherein the force feedback is proportional to a distance of the aircraft from the predetermined flight path.

* * * * *